(12) United States Patent
Jha et al.

(10) Patent No.: US 12,468,593 B2
(45) Date of Patent: Nov. 11, 2025

(54) ROOT CAUSE IDENTIFICATION IN HYBRID APPLICATIONS VIA PROBING

(71) Applicant: International Business Machines Corporation, Armonk, NY (US)

(72) Inventors: Saurabh Jha, White Plains, NY (US); Larisa Shwartz, Greenwich, CT (US); Robert Filepp, Westport, CT (US); Frank Bagehorn, Dottikon (CH); Jesus Maria Rios Aliaga, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 18/128,370

(22) Filed: Mar. 30, 2023

(65) Prior Publication Data

US 2024/0330096 A1  Oct. 3, 2024

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/3089* (2013.01)

(58) Field of Classification Search
CPC .............. G06F 11/079; G06F 11/3089; G06F 11/3093; G06F 11/3065
See application file for complete search history.

(56) References Cited

U.S. PATENT DOCUMENTS

| 8,630,962 | B2 | 1/2014 | Maeda et al. |
| 9,069,737 | B1 | 6/2015 | Kimotho et al. |
| 10,831,585 | B2 | 11/2020 | Gu |
| 10,853,161 | B2 | 12/2020 | Ahad |
| 11,281,520 | B2 | 3/2022 | Lu et al. |

(Continued)

FOREIGN PATENT DOCUMENTS

CN  207573533 U  7/2018

OTHER PUBLICATIONS

Brodie, Mark et al., "Active Probing Strategies for Problem Diagnosis in Distributed Systems", In IJCAI Aug. 9, 2003, vol. 3, 2 pages.

(Continued)

*Primary Examiner* — Katherine Lin
(74) *Attorney, Agent, or Firm* — Harrity & Harrity, LLP

(57) ABSTRACT

Mechanisms are provided that detect an anomaly in performance of a hybrid application based on a specification of required performance and collected passive monitoring data, and that generate a causal generative model based on relationships between hybrid application components and computing system architecture components extracted from the passive monitoring data. Root cause identification (RCI) logic is executed on the causal generative model to identify a set of candidate root causes of the detected anomaly. One or more probes are identified for active monitoring data collection targeting the identified set of candidate root causes, which are then executed to collect probe data. Reinforcement learning is performed of the RCI logic to update the RCI logic based on the probe data. The set of candidate root causes is updated based on the reinforcement learning.

20 Claims, 7 Drawing Sheets

(56) References Cited

U.S. PATENT DOCUMENTS

| | | |
|---|---|---|
| 2009/0313202 A1 | 12/2009 | Grabarnik et al. |
| 2020/0081420 A1* | 3/2020 | Fraser .................. G06N 20/00 |
| 2020/0127901 A1* | 4/2020 | Hariharan ............ H04B 17/336 |
| 2021/0373987 A1* | 12/2021 | Raghavendra ........ G06F 18/217 |
| 2022/0027331 A1 | 1/2022 | Hwang et al. |
| 2022/0108262 A1* | 4/2022 | Cella .............. G06Q 10/063118 |

OTHER PUBLICATIONS

Gan, Yu et al., "Practical and Scalable ML-Driven Cloud Performance Debugging With Sage", IEEE Micro ( vol. 42, Issue: 4, Jul. 1-Aug. 2022), pp. 27-36.

Jha, Saurabh et al., "Live Forensics for HPC Systems: A Case Study on Distributed Storage Systems", In SC20: International Conference for High Performance Computing, Networking, Storage and Analysis Nov. 9, 2020, 15 pages. IEEE.

* cited by examiner

| Depend relationship | components |
|---|---|
| Request 1 | s-A, s-B, s-C |
| Request 2 | s-E, s-C |
| Request 3 | s-D, s-B, s-C |

| In relationship | components |
|---|---|
| s-D | $N_4$ |
| s-E | $N_4$, |
| s-A | $N_1$, $N_2$ |
| s-C | $N_3$ |
| s-B | $N_4$, $N_3$ |

| Or relationship | components |
|---|---|
| s-A | $N_1$, $N_2$ |
| s-B | $N_4$, $N_3$ |

| Depend Relationship | | | And relationship | | | Or relationship | |
|---|---|---|---|---|---|---|---|
| r-ABC | s-A | s-B | s-C | $N_1$ | $N_3$ | $N_1, N_2$ | $N_4, N_3$ |
| r-EC | s-E | s-C | $N_4$ | $N_3$ | $N_3$ | - | - |
| r-DBC | s-D | s-B | s-C | $N_4$ | $N_3$ | - | - |

ROOT CAUSE IDENTIFICATION IN HYBRID APPLICATIONS VIA PROBING

BACKGROUND

The present application relates generally to an improved data processing apparatus and method and more specifically to an improved computing tool and improved computing tool operations/functionality for performing root cause identification in hybrid applications via probing.

Hybrid applications are applications that combine elements of both native applications and web applications, usually composed of multiple functional modules that call one another to serve user requests while meeting expectations of service level objectives (SLOs) and/or service level agreements (SLAs). These hybrid applications may be implemented in a hybrid cloud (combinations of public and private cloud computing environments) or multi-cloud environment (cloud computing environments comprising computing services from at least two cloud providers). As such, some components of the hybrid application may be present in different cloud environments and provided by different cloud service providers.

In order to meet SLO/SLA requirements, it is important to ensure that the hybrid application continues to function satisfactorily. However, processing of user requests by the hybrid application, as with all applications, may fail or may return successfully but with significant delay, i.e., service time is unexpectedly high. If these failures or these service times do not meet with the SLO/SLA requirements, such failures or performance issues may lead to significant loss of revenue or brand dilution for the hybrid application provider. Therefore, it is important to be able to diagnose the cause of failures or performance issues automatically at runtime rapidly in order to execute mitigation/recovery actions and prevent SLO/SLA requirements violations, as well as develop more resilient and performant software and system architectures.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided that comprises detecting an anomaly in performance of the hybrid application based on a specification of required performance and collected passive monitoring data, and generating a causal generative model based on relationships between hybrid application components and computing system architecture components extracted from the passive monitoring data. The method further comprises executing a root cause identification (RCI) logic of a RCI engine on the causal generative model to identify a set of candidate root causes of the detected anomaly. The method also comprises identifying one or more probes for active monitoring data collection targeting the identified set of candidate root causes. In addition, the method comprises executing the one or more probes on the set of candidate root causes to collect probe data, and performing reinforcement learning of the RCI engine at least by updating the RCI logic based on the probe data. Moreover, the method comprises updating the set of candidate root causes based on the reinforcement learning of the RCI engine.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
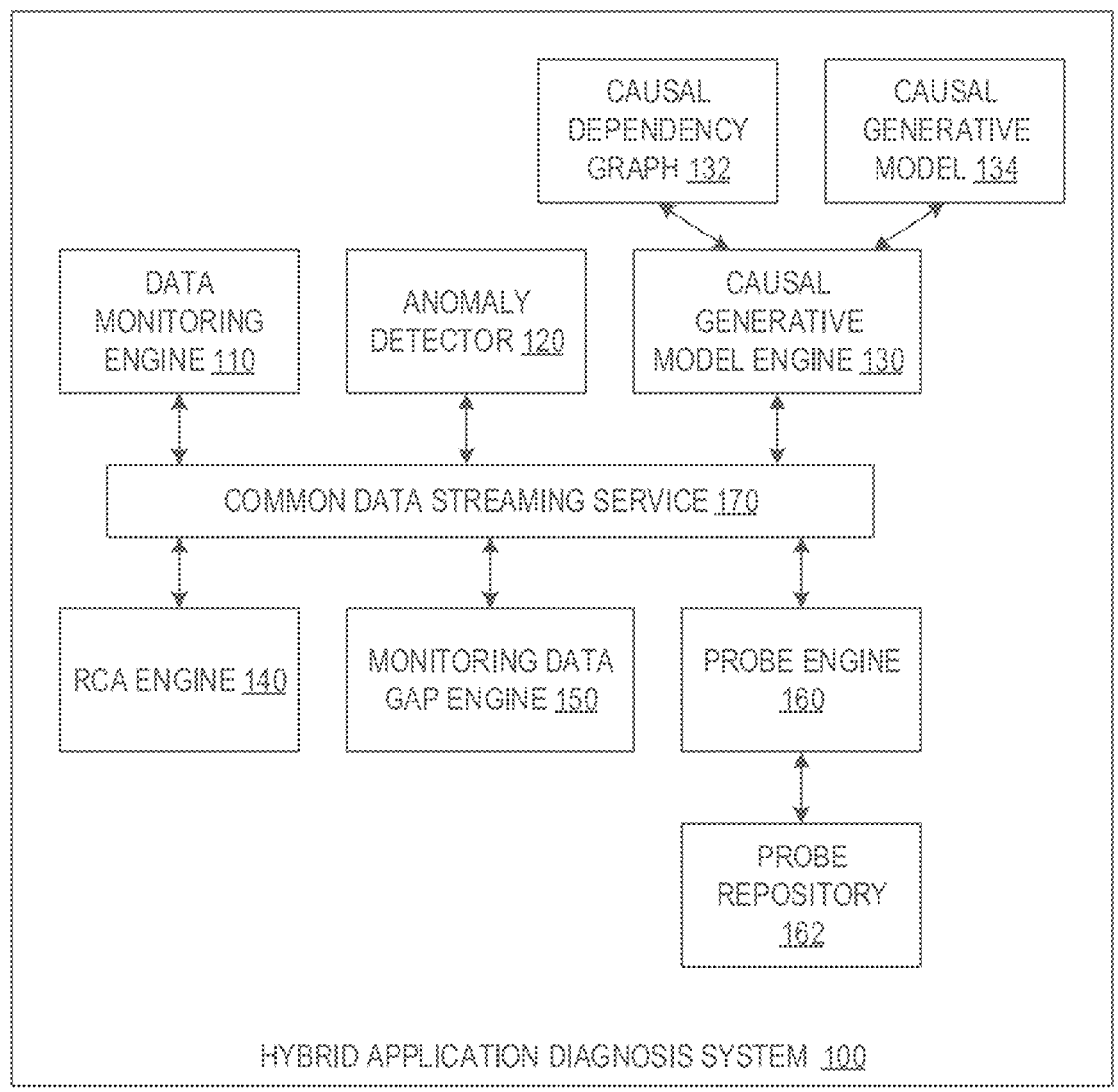
FIG. 1 is an example block diagram of the primary operational components of a hybrid application diagnostic system in accordance with one illustrative embodiment.

As noted above, it is important to be able to diagnose the cause of failures or performance issues of applications automatically and rapidly at runtime in order to execute mitigation/recovery actions and prevent service level objective (SLO)/service level agreement (SLA) requirements violations, as well as develop more resilient and performant software and system architectures. However, due to the hybrid nature of hybrid applications, diagnosing the sources of such failures or performance issues is problematic. Because the hybrid application comprises multiple components, from multiple providers, and potentially multiple cloud computing environments, using the same set of diagnostic tools for each component, each provider, and each cloud computing environment is not feasible and does not generate adequate results. That is, failures and performance issues propagate, leading to multiple symptoms on multiple components of the hybrid application, which may be in multiple different cloud computing environments and provided by multiple different providers using different architectures and data structures. Monitoring data used for diagnosis may not be sufficient to identify the cause of the failure or performance issue across the multiple components, cloud environments, and providers. Moreover, it is difficult to port diagnostic mechanisms across applications and cloud providers in a transparent and scalable way.

The illustrative embodiments provide an improved computing tool an improved computing tool functionality/operations that automatically perform diagnostic operations on hybrid applications which includes root cause identification of anomalies in hybrid application performance and, if needed to acquire additional monitoring data. The illustrative embodiments further include mechanisms that automatically generate/recommend probes for execution to obtain additional performance data for improving the root cause identification.

The illustrative embodiments provide improved computing tools and improved computing tool functionality to identify and model causal dependencies between components of hybrid applications including computer environment architectures to thereby generate a causal generative model. The causal generative model is application and infrastructure specific, however only leverages request-response paths which are available at runtime. The causal generative model is hierarchical and thus, allows for modeling arbitrary topology which is fit for microservices-based cloud-native applications. The causal generative model can be used with any cloud provider making the causal generative model applicable to hybrid cloud and multi-cloud computing environments.

The illustrative embodiments provide improved computing tools and improved computing tool functionality to use the causal generative model to identify the root cause of performance service level objective (SLO) and/or service level agreement (SLA) violations. In so doing, the problem of root cause identification is formulated such that no pretraining of the root cause identification (RCI) engine is required. That is, no pre-labeled training datasets are needed for training the machine learning computer model(s) implemented in the RCI engine. To the contrary, the machine learning computer model(s) of the RCI engine are trained based on reinforcement learning from the runtime data itself. As a result, the resource expenditures required to generate training datasets with labeled data are avoided by the mechanisms of the illustrative embodiments.

The illustrative embodiments further provide improved computing tools and improved computing tool functionality to formulate a probing problem as a partially observable Markov decision process (POMDP) to reduce the total number of probes that need to be launched to acquire additional diagnostic data from components of the hybrid application. The probing problem identifies probes needed to gather additional diagnostic data from components of the hybrid application, and in some cases generate these probes for automatic execution. This identification and generation of probes may be based on identified monitoring data gaps and operates to perform fusion of the causal generative model with reinforcement learning in the RCI engine. The identification and generation of such probes is performed based on the monitoring dataset and probes are only executed when the monitoring data is not sufficient to identify the root cause of performance SLO/SLA issues.

Thus, with the mechanisms of the illustrative embodiments, root cause identification can be performed on hybrid applications which may be composed of multiple components across multiple cloud computing systems and multiple cloud providers. The mechanisms of the illustrative embodiments provide an adaptive reinforcement learning approach to performing the root cause identification using a causal generative model and the automatic identification, generation, and execution of probes to gather hybrid application performance data in response to identified gaps in performance data. Thus, the illustrative embodiments provide an improved computing tool and improved computing tool functionality for automated reinforcement learning based root cause identification of failures or performance anomalies, where the computing tool performs such root cause identification for hybrid applications having components, e.g., services and/or microservices, which may span across cloud computing systems and cloud system providers.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As noted above, the illustrative embodiments provide an improved computing tool and improved computing tool functionality that automatically performs reinforcement learning of root cause identification of performance issues of hybrid applications. The root cause identification and reinforcement learning is performed based on a causal generation model and dynamic identification, generation, and execution of probes for gathering performance data from components of the hybrid application in response to identifying monitoring data gaps.

FIG. 1 is an example block diagram of the primary operational components of a hybrid application diagnostic system in accordance with one illustrative embodiment. The operational components shown in FIG. 1 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving diagnostic capabilities, especially for hybrid applications, and providing a specific solution that implements hybrid application diagnostic system functionality that, through machine reinforcement learning, learns causal relationships between monitoring data and root causes of anomalies, identifies gaps in monitoring data, and recommends/generates probes directed to those gaps in monitoring data which feed the reinforcement learning. These functionalities cannot be practically performed by human beings as a mental process and are not directed to organizing any human activity.

As shown in FIG. 1, the hybrid application diagnostic system 100 comprises a data monitoring engine 110, an anomaly detector 120, a causal generative model engine 130, a root cause identification (RCI) engine 140, monitoring data gap engine 150, and a probe engine 160. These elements of the hybrid application diagnostic system 100 may send data and messages between each other via a common data streaming service 170, such as an Apache Kafka® publish/subscribe message queue/broker, or the like (Apache Kafka® is a registered trademark of the Apache Software Foundation). The data monitoring engine 110 comprises computer logic to collect monitoring data for a hybrid application, such as path, latency, and error rate or error count data when processing user requests. This monitoring data is collected to determine performance relative to SLOs/SLAs to ensure that the requirements of such SLOs/SLAs are being met. If a violation of a SLO/SLA is determined to exist, the data monitoring engine 110, or other agents executing in conjunction with the monitored components of the hybrid application, may generate an alert specifying the violation and providing monitoring data associated with the alert.

The data monitoring engine 110, or application performance monitor (APM), may implement traces of hybrid applications using known tracing tools and monitoring tools, to obtain an initial diagnostic result in response to an alert indicating that the monitored application is not performing as desired. Various data monitoring services may be used to provide such alerts and monitoring data, such as IBM® Instana™, available from International Business Machines (IBM®) Corporation of Armonk, New York (Instana™ and IBM® are trademarks of International Business Machines Corporation). The data collected from existing monitoring services, such as Instana™, is referred to herein as passive monitoring data, meaning that active probing to collect specific monitoring data based on identified monitoring data gaps is not performed in order to obtain the passive data.

As described hereafter, in accordance with one or more illustrative embodiments, the data monitoring engine 110 may also be modified or configured to collect data or otherwise operate in conjunction with one or more probes of the probe engine 160. These dynamically identified and generated probes, i.e., executable algorithms directed to performing active data collection from specific paths or processes of an application, may be executed to collect additional monitoring data, referred to as probe data, which is specifically based on the identification of monitoring data gaps identified by the monitoring data gap engine 150. In some illustrative embodiments, the data monitoring engine 110, or APM 110, collects user request/response path data via tracing at runtime, or the probes of the illustrative embodiments (if the request response paths are known), and extracts all the unique paths and their performance data, e.g., latencies, from the collected monitoring data.

As touched upon above, a "probe" in the context of the present description is a computer program or algorithm that is used to investigate or test the status of a component of a hybrid application. In some illustrative embodiments, there are two primary types of probes used, i.e., health check test probes and monitoring data gathering probes. The health check test probes execute an algorithm to test a corresponding component and return the output of the algorithm. In some illustrative embodiments, these health check test probes test the destination endpoints and everything from the source to the destination endpoint, with examples being ICMP/TCP, I/O, APIs, and third party applications. The monitoring data gathering probes return a desired dataset that already exists in the probed component but which is not collected due to overhead of the periodic passive dataset collection operations. Examples of monitoring data gathering probes include probes that evaluate fine grained memory operations, fine grained CPU/Cache measurements, and measurements via Berkely Packet Filters.

The anomaly detector 120 provides computer logic to process monitoring data and analyze the monitoring data to identify whether the monitoring data comprises patterns indicative of an anomaly in performance of a hybrid application. The anomaly detector 120 executes anomaly detection algorithms to identify if any of the unique paths are anomalous, e.g., key performance indicators (KPIs) deviate from predetermined normal performance, e.g., predetermined levels of KPIs determined to represent normal behavior of the application, or have failed (e.g., HTTP 500 error or the like). This anomaly detector 120 may execute user specified rules, such as may be provided in a SLO/SLA specification 122, or automated computer logic that extracts user request/response path data from the traces in the monitoring data and the corresponding performance data, e.g., data corresponding to key performance indicators (KPIs) or the like, such as latency, failure rates/counts, and the like.

Root cause identification (RCI) engine 140 generates an initial identification of candidate causes of the anomaly, which may include multiple different potential causes, e.g., the anomaly is caused by one of 5 different casual elements of the hybrid application, each looking similar due to the symptoms of the anomaly. The RCI engine 140 operates based on a causal generative model (CGM) which is created by the causal generative model engine 130 for the identified anomaly. The causal generative model engine 130 generates, from the monitoring data, a causal dependency graph data structure 132 which correlates the hybrid application components, e.g., microservices or the like, with the computing system infrastructure components, e.g., virtual and/or hardware based processing nodes. The causal dependency graph data structure 132 comprises first nodes for the hybrid application components, second nodes for the computing system infrastructure components, and edges that link nodes and specify dependencies between the hybrid application components with one another, and between hybrid application components and computer system infrastructure components. The causal dependency graph data structure 132 is generated assuming that there are N system components, with the state of the system denoted by a vector X: $(X_1, \ldots, X_N)$ where $0 \le X_i \le 1$. $X_i$-0 indicates the probability that observed performance SLO/SLA violation is due to the $i^{th}$ component. For sake of simplicity, $X_i$ is labeled as $X_{component\ name}$.

The causal dependency graph data structure 132 is processed by the causal generative model engine 130 to generate a causal generative model 134 that represents the various relationships between the components of the hybrid application and the computing system infrastructure, where these relationships do not only represent dependencies with regard to processing user requests. That is, the causal generative model 134 models the dependency relationships between hybrid application components when processing user requests, but also represents the "In" and "Or" relationships between the hybrid application components and the computing system infrastructure components, as will be described in greater detail hereafter. The "In" relationships represent which hybrid application components are associated with which system infrastructure components. The "Or" relationships represent the replicas of hybrid application components with regard to system infrastructure components, where a replica is an additional instance of the same hybrid application component. For purposes of the following description, it will be assumed that the hybrid application components are microservices, although it should be appreciated that the illustrative embodiments are not limited to a microservices architecture and may be used with any architecture involved hybrid applications having multiple components that communicate and operate with one another, where the components may be provided in a distributed manner, potentially across multiple cloud computing systems and multiple cloud service providers.

These dependencies, "In" relationships, and "Or" relationships are represented in the causal generative model 134 along with additional model elements that model the "and" relationships between nodes of the causal dependency graph 132, as extracted from the dependencies and "In" relationships. The causal generative model 134 further includes additional model elements that represent the "Or" relationships between nodes of the causal dependency graph 132. Additional causal generative model 134 elements are provided that represent a prior state, such as by using a beta distribution, and elements to model expected success, such as by using a binomial distribution.

The RCI engine 140 models the hybrid application using the causal generative model 134 to generate a solution using a stochastic variational inference or other known or later developed inference based solver. Stochastic variational inference is only one example of a possible solver and other solvers may be used without departing from the spirit and scope of the present invention. This solution presents an initial set of nodes that are believed to be candidates for the possible root cause of the anomaly, i.e., violation of a performance requirement in the SLO/SLA. In generating this initial set of root causes, the RCI engine 140 may determine probability measures for each of the nodes of the causal generative model 134 based on the characteristics of the anomaly and the monitoring data obtained via the data monitoring engine 110 and anomaly detector 120.

Thresholds may be established for specifying whether a particular probability measure corresponds to a likely root cause, does not correspond to a likely root cause, or is indeterminate as to whether the probability measure indicates a root cause or not. For example, a range of probabilities may be established where 0 indicates a certainty that a corresponding node is a root cause of an anomaly, 1 indicates a certainty of not being a root cause of an anomaly, and values between 0 and 1 represent different levels of certainty that a node is likely a root cause of an anomaly. Within this range of probabilities, thresholds may be defined for identifying nodes that are considered to be root causes, nodes that are considered to clearly not be root causes, and nodes that are indeterminate as to whether they are root causes of an anomaly. In one illustrative embodiments, a first threshold of approximately 0.25 may be defined such that if a probability value is equal to or less than 0.25, then the corresponding node is considered to be a root cause of an anomaly. Similarly, a second threshold of approximately 0.75 may be defined such that if a probability value is equal to or greater than 0.75, then the node is considered to clearly not be a root cause of the anomaly. Probability values between 0.25 and 0.75 may be considered indeterminate and thus, may require additional evaluations in accordance with one or more of the illustrative embodiments through active probing, as will be described hereafter. It should be appreciated that these examples of threshold values are only examples and are not to be considered limiting on the illustrative embodiments. To the contrary, any suitable threshold values may be used without departing from the spirit and scope of the present invention as will be readily apparent to those of ordinary skill in the art in view of the present description.

As can be seen, this initial set of candidate root causes is based on the passive monitoring data obtained from monitoring the performance of the hybrid application through existing monitoring tools, such as IBM® Instana™. In some cases, there may be multiple potential root causes identified in this initial set of candidate root causes. For example, there may not be any node that is clearly identified as a root cause but nodes may be classified in the "indeterminate" range of probabilities, or there may be one or more nodes indicated as root causes, yet others may also be indicated as "indeterminate" which may require further evaluation to identify which node is most likely the root cause of the anomaly. In such cases, the illustrative embodiments provide additional computer functionality for performing active probing of the hybrid application components so as to update, through reinforcement learning, the monitoring data and augment the monitoring data to generate more accurate root cause identification results by the RCI engine 140.

In order to perform active probing of the hybrid application, a monitoring data gap engine 150 first identifies whether monitoring data gaps exist and where those monitoring data gaps are present in the causal generative model 134. The monitoring data gap engine 150 may implement a satisfiability (SAT) solver, for example. The monitoring coverage may be expressed as a Boolean SAT (B-SAT), for example. A SAT solver is a computer program which aims to solve the Boolean satisfiability problem. With an input of a formula over Boolean variables, such as "(x or y) and (x or not y)", a SAT solver outputs whether the formula is satisfiable, meaning that there are possible values of x and y which make the formula true, or unsatisfiable, meaning that there are no such values of x and y. In this case, the formula is satisfiable when x is true, so the solver should return "satisfiable". With application to the potential root causes identified as the initial set of candidate root causes, the SAT solver may operate to determine whether conditions between two or more of the potential root causes are indicative of whether one of the potential root causes is the root cause of the anomaly are satisfied. If not, then a monitoring data gap may be identified, i.e., it is not possible given the current monitoring data to differentiate one possible root cause from the other with regard to its probability of being the actual root cause.

For nodes identified as potential root causes by the RCI engine 140, and which are associated with monitoring data gaps as identified by the monitoring data gap engine 150, the probe engine 160 identifies and/or generates probes for active monitoring data collection. It should be appreciated that the probe engine 160 is launched only if the monitoring data coverage and result of the SAT solver analysis identifies that the current observability is insufficient, i.e., passive monitoring data collection is not sufficient for diagnosing the root cause of the anomaly in performance of the hybrid application. That is, a monitoring data gap indicates an inability to distinguish between multiple candidate or potential root causes of an anomaly. A monitoring data gap is not present if the RCI engine 140 is able to clearly identify one or more root causes of an anomaly and thus, is able to distinguish between multiple candidate or potential root causes.

A probe repository 162 may be provided that has a plurality of predefined probes, e.g., hundreds or thousands of probes, which may be selected based on characteristics of the monitoring data gap and characteristics of the probe itself. If a probe does not exist in the probe repository 162 that has characteristics that match the characteristics of the monitoring data gap, then a closest match may be found and used to generate an instance for the current monitoring data gap, for example. The probe engine 160 performs a sequential probe selection/generation operation, as described hereafter, which selects/generates a probe that is determined to be one that will garner the most additional information about the monitoring data gap from the available probes. The selected/generated probe is executed and additional active monitoring data is gathered (referred to herein as probe data), and provided as additional monitoring data for the RCI engine 140 to update its candidate root cause identification. The process repeats with the evaluation of monitoring data gaps by the monitoring data gap engine 150 to thereby identify whether any monitoring data gaps still exist. If so, the operation proceeds to the next sequential probe selection/generation until a convergence condition is met, e.g., no more appreciable change in the amount of information available, e.g., the set of possible root causes has not changed over Y number of iterations, where Y may be user defined or otherwise selected for the particular implementation, or a predetermined number of iterations of sequential probe selection and execution have been completed.

For example, if a service invoked by the hybrid application is determined to not be working, e.g., a high latency or error rate, or a failure notification is received, it may not be known whether the service is not working due to a network connection issues, the service itself having terminated, a lack of available processor/memory resources, or the like. Thus, based on the gathered monitoring data, the nature of the not working condition may be evaluated and mapped to one or more probes that may gather information, i.e., probe data, that may provide further information regarding that type of monitoring data gap. The probe engine 160 may implement a model that learns over time the characteristics of monitoring data gaps and which probes are the best option for obtaining additional information to resolve the monitoring data gaps. If a particular node that is initially determined to be a possible root cause of an anomaly, and that node's associated monitoring data gap, is determined to be mapped to a plurality of possible probes, then all probes may be selected as part of a subset and sequentially executed. For example, a probe may perform a ping action to measure the latency of a response from a service and then evaluate the response to determine if the response shows a service status as successful, how long it took to receive the response, whether the response includes a payload, e.g., CPU and/or cache values, etc. This additional probe data may be provided to the RCI engine 140 for inclusion in its determination of probable root causes of an anomaly, e.g., if the ping shows that component A is not the problem, then the set of root cause candidates may be appropriately modified.

That is, assume that there are K probes in the probe repository 162, for example, which the set of K probes being denoted as T. These probes may include various types of probes including synthetic application probes (such as GET, POST, DELETE, etc.), network level probes (such as DNS query, ICMP), processor probes (such as circuit tests), input/output (I/O) probes (such as read, write, create, delete), and the like. The probes operate to cause the hybrid application to perform an operation specific to the particular components being tested or probed, and then obtain performance monitoring data to determine how well those particular components perform. For example, a probe may send a read command to a particular component to cause the component to read a location from a storage device to determine latency and error rates along the path from the hybrid application component to the storage device to determine if that path may be a source of the anomaly. The latency and error rate data may be gathered by the probe and provided as probe data to the RCI engine 140 to thereby perform reinforcement learning by the RCI engine 140 which now performs its operations on this expanded set of monitoring data.

A probe $T_i$ in the set T informs about a set of one or more components as to whether they are health or not. That is, there is a mapping M that maps $M:T_i \to \xi_i$, where $\xi_i$ consists of components that are required to complete the probing request $T_i$. If a probe returns successfully and within a specified SLO/SLA response time, then all components in gi are not the cause of the observed anomaly, i.e., failure or SLO/SLA violation.

Thus, when the monitoring data is determined to not be sufficient to identify the root cause of the anomaly, i.e., as part of the initial root cause identification and monitoring data gap identification or during subsequent iterations of the sequential probe selection process, the probe engine 160 selects and executes a subset of probes from T to improve the data quality which can then be used by the RCI engine 140 for diagnosis of the root cause(s). In some illustrative embodiments, this problem is formulated as a partially observable Markov Decision Process (PoMDP) which aims to select $T \leftarrow \mathrm{argmin}_T \Sigma_i X_i$, where X is the state of the ith component. This essentially finds the smallest, or minimum, set of probes needed to evaluate the components of the hybrid application that are associated with the monitoring data gap and the potential root causes of the anomaly. This problem may be solved through a reinforcement learning (RL) proximal policy optimization (PPO), for example. By using a reinforcement learning approach, there is no need to develop system specific heuristics. Furthermore, the reinforcement learning approach can automatically adapt to any system or hybrid application, with the causal generative model 134 being used by the RCI engine 140 to estimate the reward for the reinforcement learning.

With the sequential probe selection/generation, if no further monitoring data gaps are identified, the predetermined number of iterations of the sequential probe selection and reinforcement learning of the RCI engine 140 based on the additional probe data are performed, or if it is determined that no more appreciable information may be achieved from executing additional probes, e.g., no change in the set of candidate root causes will be achieved, then a final set of one or more root causes for the anomaly may be output to thereby identify to an authorized user the potential cause(s) of the anomaly in performance of the hybrid application, where the potential cause(s) may be any component(s) of the hybrid application potentially across multiple cloud computing architectures, cloud computing providers, and the like. The root cause(s), having been identified, may be used as a basis for not only resolving the detected anomaly in performance, but also may serve to strengthen the hybrid application against future anomalies of this same type being experienced.

It should be appreciated that the final set of one or more root cause(s) may not be a single root cause, i.e., the cause of the anomaly may not be able to be narrowed down to a single component of the hybrid application. However, even in such cases where the root cause cannot be uniquely identified, the automated mechanisms of the illustrative embodiments operate to narrow the set of root cause(s) to a smaller set of components than what was initially determined by the RCI engine 140 operating only on passive monitoring data. That is, there may be a large number, e.g., 100 or more, possible root causes identified through the initial analysis performed by the RCI engine 140 on the passive monitoring data. Thereafter, through the operation of the illustrative embodiments and the dynamic monitoring data collection by performing active probing to obtain the probe data, this initial set of possible root causes may be reduced to 5 or less, for example. Thus, while a final single root cause may not be able to be specifically identified, the scope of the possible root causes is significantly minimized such that additional evaluations may be made more efficient and less time and resource intensive.

Root cause identification in hybrid applications is a difficult problem that cannot be practically performed entirely by human beings because it requires logic, knowledge of troubleshooting techniques, and knowledge of an application as full-stack system, with potentially hundreds or even thousands of possible causes of anomalies in hybrid applications spread across multiple possible architectures and components provided by multiple possible parties. With continuous change (that could easy reach 100 changes a month), the operational knowledge of a hybrid application is ephemeral. In addition, when any part of the hybrid application is running in containers, the change in infrastructure that the hybrid application is running on could happen as often as every 2-3 seconds. Thus, with continuous change, the space of root cause identification is unbounded, making human identification of root causes of anomalies in hybrid applications impractical. Hence, there is the need for improved computing tools and improved computing tool functionality, as provided by the illustrative embodiments set forth herein, to address root cause identification in hybrid applications.

In view of the above, it is clear that the illustrative embodiments provide an improved computing tool and improved computing tool functionality that facilitates diagnosis of anomalies in hybrid application performance in a manner that does not require system specific heuristics and can operate in single cloud or multi-cloud hybrid application environments. The illustrative embodiments implement root cause identification across multiple hybrid application components available potentially in multiple different cloud computing systems, and provided by multiple different cloud computing service providers. The illustrative embodiments do not require any pre-training of the RCI engine and thus, do not require expenditures of resources to generate labeled training datasets. To the contrary, the illustrative embodiments implement a reinforcement learning architecture that learns root cause identification with both passive monitoring data and active monitoring data obtained through specific probing of components of a hybrid application after having performed an initial evaluation of candidate root causes based on the passive monitoring data.

As noted above, as an initial part of the operation of the illustrative embodiments, a data monitoring engine 110 operates to provide monitoring data for user request/response paths of the hybrid application. This may be accomplished at runtime using tracing mechanisms, which are generally known in the art, or probes in accordance with the illustrative embodiments as discussed above. The monitoring data may comprise various types of performance related data directed to key performance indicators (KPIs) and performance requirements of SLOs/SLAs, e.g., latency, error rate, failures, etc. From this user request/response path data, the causal generative model engine 130 generates a causal dependency graph data structure 132 which correlates the hybrid application components, e.g., microservices or the like, with the computing system infrastructure components, e.g., virtual and/or hardware based processing nodes.

Figures 2, 3:
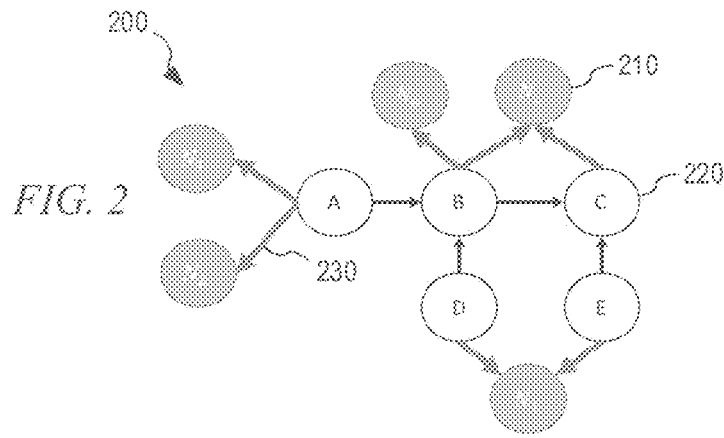
FIG. 2 is an example diagram of a causal dependency graph in accordance with one illustrative embodiment.
FIG. 3 is an example diagram showing different dependency, "in", and "or" relationships between services and nodes in the causal dependency graph of FIG. 2.

FIG. 2 is an example diagram of a causal dependency graph in accordance with one illustrative embodiment. As shown in FIG. 2, the causal dependency graph 200, in accordance with the illustrative embodiments, includes nodes, referenced as $N_x$ where x is a numeric value, e.g., x=1, 2, 3, 4, etc., identifying different computing system resources, which represent the various virtual and/or hardware based computing system architecture components that are associated with the hybrid application. That is, for example, the trace information obtained by the data monitoring engine 110 may specify which virtual/hardware processors a particular component of the hybrid application is executing on, and these processors may be each represented by a separate node $N_x$ 210 in the causal dependency graph 200. The nodes 220 referenced as "s-" represent different components of the hybrid application, which for purposes of the example shown in FIG. 2 are considered to be services "s" or microservices. Edges 230 between nodes 210, 220 designate dependencies between the components such that edges 230 between services, i.e. nodes 210, indicate one service calling another service in the hybrid application, while edges between service nodes 210 and virtual/hardware nodes 220 represent hybrid application components executing on or otherwise being associated with the corresponding virtual/hardware component, e.g., virtual machine or CPU. The arrows may designate which components are executing on which other components, and which components invoke other components.

As shown in the figure, some services exist as replicas, i.e., they are available on multiple system architecture nodes. For example, service s-A, in the depicted example, has instances, or replicas of the service s-A, on both of nodes $N_1$ and $N_2$ which, in the causal graph data structure, are separate dependencies Similarly, service s-B exists as replicas on both nodes $N_3$ and $N_4$. With such replicas, such as in ReplicaSets in Kubernetes, an application needs only one instance of the service to execute the functionality, e.g., as shown in FIG. 2, service s-A can fulfill the user request by executing either s-A running on $N_1$ or $N_2$.

The causal dependency graph 200 of the illustrative embodiments combines nodes for both the hybrid application components and nodes for the computing system architecture components. Moreover, the causal generative model engine 130 provides logic that analyzes the causal dependency graph 200 and extracts from the causal dependency graph 200 data structures, generated from the passive monitoring data, various additional relationships that represent not only the dependency relationships, but also other more complex relationships between the hybrid application components, e.g., services, and the computing system architecture components, e.g., the processors (virtual/hardware). These additional relationships are referred to as "In" relationships and "Or" relationships, and capture the ReplicaSets as well as the correspondence between hybrid application components and computing system architecture components.

FIG. 3 is an example diagram showing different dependency, "in", and "or" relationships between services and nodes in the causal dependency graph of FIG. 2. As shown in FIG. 3, the data structure of nodal relationships 300 extracted from the causal dependency graph by the mechanisms of the illustrative embodiments include depend relationships 310, "In" relationships 320, and "Or" relationships 330. The depend relationships 310 may be obtained from traces or probes executed on the hybrid application as part of processing requests to thereby identify which components of the hybrid application are executed and invoked by other components of the hybrid application. For example, as shown in FIG. 3, with continued reference to FIG. 2, for a first request (Request 1), the hybrid application invokes services A, then B, then C. The corresponding components, s-A, s-B, and s-C are shown in the table of FIG. 3. Similarly, for a second request (Request 2), the hybrid application invokes services E and then C, with the corresponding components s-E and s-C being shown in the table of FIG. 3. Thus, the depend relationships 310 represent the relationships between components of the hybrid application, e.g., the services invoked, to process requests.

The "In" relationships 320 are extracted from the edges of the causal dependency graph that connect hybrid application components with computer system architecture components, e.g., edges connecting "s-" nodes and "$N_x$" nodes. Thus, as shown in FIG. 3, the "In" relationships indicate which computer system architecture components the hybrid application components are executed on. For example, service s-D is executed on node $N_4$ and service s-C is executed on node $N_3$. Moreover, some services are replicas and execute on multiple nodes as separate service instances, e.g., service s-A executes on both nodes $N_3$ and $N_2$. Thus, replica instances may be extracted from the causal dependency graph 200.

The "Or" relationships 330 represent the potential alternative instances of hybrid application components, i.e., the replicas, which may be used to process requests via the hybrid application. The "Or" relationships 330 specifically identify which nodes execute separate instances of the same service, e.g., s-B is executed on both nodes $N_3$ and $N_4$. It should be noted that the "In" relationships 320 specify different information from the "Or" relationships 330. For example, If the microservice s-A is "in" system architecture nodes $N_1$ and $N_2$, this does not necessarily mean that microservice s-A has an "Or" relationship with regard to nodes $N_1$ and $N_2$. For example, it may be determined, through additional information in the monitored data, that all traffic from a "test user" is forwarded to the s-A instance in node $N_1$ and all traffic from a "production user" is forwarded to the s-A instance in node $N_2$. Thus, in this case, there is no "Or" relation because the traffic path is completely determined by the particular type of user. This is just one example where "In" relationships may not translate to "Or" relationships, and those of ordinary skill in the art will recognize that other conditions may likewise cause such differences between "In" and "Or" relationships.

Figure 4A:
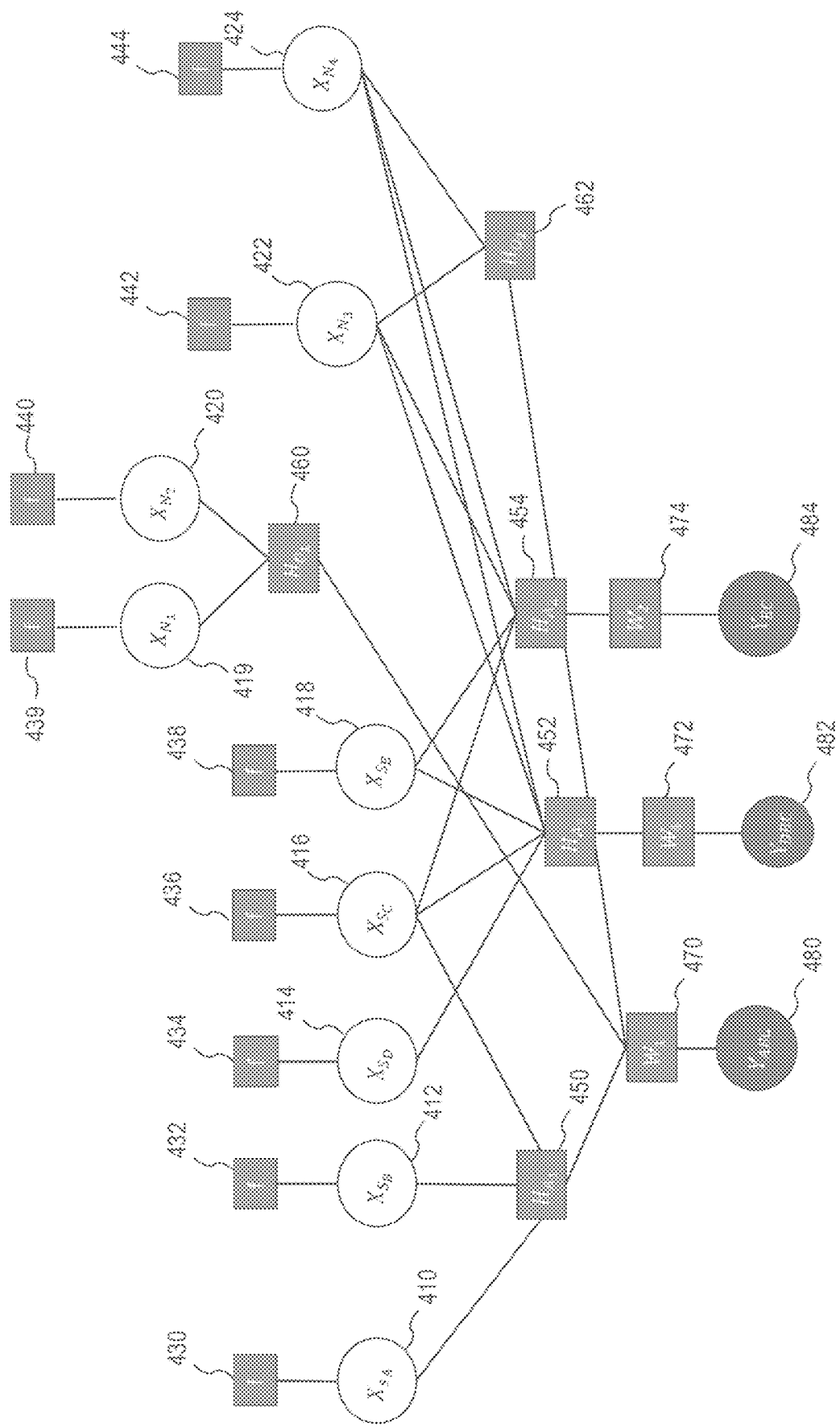
FIG. 4A is an example diagram of a causal generative model for root cause identification (RCI) in accordance with one illustrative embodiment.

From the extracted relationships shown in FIG. 3, the casual generative model engine 130 generates a causal generative model that models the various states of the hybrid application components and computer system architecture components, and their relationships. FIG. 4 is an example diagram of a causal generative model 400 for root cause identification (RCI) in accordance with one illustrative embodiment using the examples of FIGS. 2-3 as a continuing example. As shown in FIG. 4, nodes 410-424 are provided in the causal generative model for each of the hybrid application components and computer system architecture components to model the states of these components, where the states are represented as X. Thus, for example, a node $X_{SA}$ 410 represents the state of service s-A and a node $X_{N2}$ 420 represents the state of processor node $N_2$. Each node 410-424 has an input node f 430-444 representing the prior state of the nodes 410-424, for example using a beta distribution. Initially, it is assumed that all of the nodes 410-424 have a prior state that is healthy, e.g., a probability of anomaly of 1.0 (not a source of an anomaly).

In accordance with the relationships extracted from the causal dependency graph data structure 200 in FIG. 2 and represented in the table data structure shown in FIG. 3, additional nodes 450-454 represent the models $H_{Ai}$ for modeling AND relationships which are extracted from the depend and "In" relationships of FIG. 3. For example, from the depend relationship for Request 1, or Y_ABC, it is known that services s-A, s-B, AND s-C are invoked to process the request (see node $H_{A1}$). The computer system architecture nodes that are used to execute these services are nodes $N_1$, $N_2$ (see node $H_{O1}$), and $N_3$ (see node $W_1$). Similarly, nodes s-E and s-C are invoked for Request 2, with these services being executed on nodes $N_3$ and $N_4$ (see node $H_{A2}$). Nodes Hoi 460-462 are added that model the "Or" relationships of FIG. 3. Nodes W; 470-474 represent models of expected success of processing a request, such as by using a binomial distribution to model this successfulness.

The nodes Y 480-484 represent the observed output data for the processing of a request, e.g., Request 1, or Y_ABC, invoking services A, B, C (see node 480) and Request 2, or Y_EC, invoking services E and C (see node 484). The observed data may be any performance related data, i.e., monitoring data or probe data, such as latency, error count, failure indicators, etc.

In FIG. 4, each circular node represents the health of a unique component. In the depicted example, there are 5 services 410-418 and 4 computing system architecture nodes 418-424, for a total of 9 circular nodes 410-424. For each circular node 410-424, there is also an f node 430-444 to represent prior belief of the state of the corresponding circular node 410-424. For each row in FIG. 3, if there are "and" relationships, an $H_{Ai}$ square node 450-454 is added to the causal generative model 400, and the node $X_j$ mentioned under the "and" column is connected to the corresponding $H_{Ai}$ node. In FIG. 3, if there is an "Or" relationship, an Hoi node 460-462 is added to the casual generative model 400, and all $X_i$ nodes mentioned under the "Or" columns are connected to the corresponding Hoi node 460-462. Finally, $W_i$ nodes 470-474 are created for each row in FIG. 3, where the $W_i$ nodes 470-474 connect corresponding $X_{Ai}$ and $H_{Oi}$, and output nodes $Y_i$ 480-484.

Using the causal generative model 400, a root cause identification (RCI) is performed by RCI engine 140 to determine for each node 410-424, a probability value indicating a probability that the corresponding node is a root cause of a detected anomaly (detected by the anomaly detector 120). For example, in one illustrative embodiment, the RCI engine 140, using the causal generative model 400, represents an initial state of the nodes 410-424, using a beta distribution, as the values $\alpha_{X_i}^t = \delta \alpha_{X_i}^{t-1}$ and $B_{X_i}^t = \delta \beta_{X_i}^{t-1}$, where $\alpha_{X_i}^0 = 100$ and $\beta_{X_i}^t = 1.0$, where $\delta$ is a component health decay parameter. That is, the initial component state is considered to be healthy. The state of the nodes 410-424, X, is represented as a beta distribution $X_i = \text{Beta}(\alpha_{X_i}^t, \beta_{X_i}^t)$. The AND relationship nodes, $H_{Ai}$, are represented as $H_{Ai} = \Pi_i \text{Pa}(H_{A_i})$, i.e., the product of the parent nodes (Pa) of the node $H_A$. The OR relationship nodes, $H_O$, are represented as $H_{Oi} = 1 - \Pi_i(1 - \text{Pa}(H_{O_i}))$. The successfulness nodes, Wi, are represented as the product of the parent nodes (Pa) of the node $W_i$, i.e., $W_i = \Pi_i \text{Pa}(W_i)$. The observed data nodes, Yi, are represented as a binomial, i.e., $Y_i = \text{Binomial}(W_i, N)$, where N is the number of traces plus the number of probes. The causal generative model 400 using these representations of the various nodes is solved, in accordance with some illustrative embodiments, using stochastic variational inference or Gibbs sampling, although other solvers may also be utilized without departing from the spirit and scope of the present invention. This provides the probabilities associated with the state of each component of the system, inferred from the observed data Y.

The result of solving the model is a prediction of which nodes 410-424 are considered to be candidate root causes of a detected anomaly. For example, assume that an anomaly is detected to occur in the hybrid application when processing Request 1 involving service components s-A, s-B, s-C. It is not known whether the root cause of this anomaly is node s-A, s-B, s-C or nodes $N_1$, $N_2$, $N_3$, or $N_4$. Through the root cause identification, probabilities are calculated to determine the probability of each node being a root cause. Initially this may be based on passive monitoring data collected from traces or other monitoring system mechanisms, e.g., mechanisms of the IBM® Instana™ product. Thereafter, when performing active probing of components of the hybrid application, the data from probe results is collected and used to update the model of the states of the causal generative model 400 and re-computing the probabilities of root causes.

The probability values may be evaluated relative to predetermined threshold probability values to identify a subset of the nodes that may be considered candidate root causes of the anomaly, e.g., a first threshold of T1 representing a threshold that equal to or below would indicate a root cause, a second threshold T2 that equal to or above would indicate definitely not a root cause, and probability values between T1 and T2 indicated an indeterminate or candidate root cause requiring further active data gathering. In some illustrative embodiments T1 may be 0.25 and T2 may be 0.75, for example, where 0 is a root cause and 1.0 is not a root cause.

The monitoring data gap engine 150, based on the probability values of the nodes, identifies whether there are monitoring data gaps present in the monitoring data. A monitoring data gap exists if there is more than one candidate root cause and it cannot be determined which, if any, of the candidate root causes are an actual root cause from the observable monitoring data. If there is at least one definite root cause, e.g., probability equal to or less than T1, then it may be determined that there is no monitoring data gap even if other nodes are determined to be candidates. In some illustrative embodiments, even if there are definite root causes identified, if there are other candidates, then a monitoring data gap may still be determined to be present. Those nodes that are associated with monitoring data gaps in the causal generative model 400 may be identified and used as a basis for identifying/generating probes to perform active data gathering.

Figure 4B:
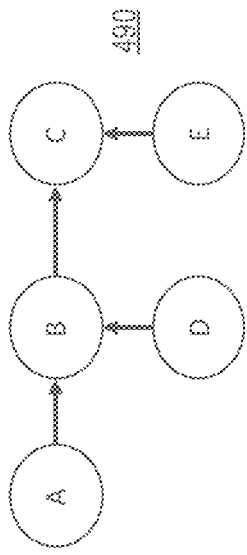
FIG. 4B is an example diagram illustrate a satisfiability solver example in accordance with one illustrative embodiment.

In some illustrative embodiments, in order to perform active probing of the hybrid application, a monitoring data gap engine 150 first identifies whether monitoring data gaps exist and where those monitoring data gaps are present in the causal generative model 134, as noted above. In some illustrative embodiments, this is done by the monitoring data gap engine 150 using a satisfiability (SAT) solver, for example, where the monitoring coverage may be expressed as a Boolean SAT (B-SAT), for example. FIG. 4B is an example diagram showing an example topology 490 (similar to the nodes A-E in FIG. 2) with corresponding requests R_ABC, R_DBC, and R_EC in one instance, and their status outputs Y_ABC, Y_DBC, and Y_EC where no data gap is determined to be present, and requests R_ABC, R_DBC and corresponding Y_ABC, Y_DBC. FIG. 4B further shows the unique fingerprint tables 493, 494 which have columns (column 1) indicating the unique fingerprint and columns (columns 2-6) indicating whether a particular component A-E failed for the particular unique fingerprint (column 1). In the depicted example, it is assumed that there is one failure at a time, e.g., values of 1 mean that the corresponding component is health, and values of 0 indicate that the corresponding component has failed and is a possible root cause. If two cells in column 1 are the same, then there is a monitoring gap. As shown in FIG. 4B, in the first scenario with requests 491, there is no data gap indicated in the table 493 as none of the unique fingerprints are the same. However, in the second scenario with requests 492, there is a data gap indicated in the table 494 as the unique fingerprints for Y_ABC-0, Y_DBC-0 is present in more than one entry of column 1.

For the case in which it is still not possible to determine the root cause from the data collected so far (i.e., there are components in the system associated with probabilities in the range between T1 and T2) or there are entries in the fingerprint table having unique fingerprints that are the same, the probe engine 160 of the illustrative embodiments is used to identify the next set of probes from the probe repository 162 to launch in order to gather more information or to determine whether, once exhausted all the probes in the repository, if it is necessary to add new probes to this repository. The selection of which probes to execute next depends on what is known at that point in time about the state of the system's components. The expected "information gain" of each probe from the repository not yet executed is computed. The "information gain" measures the expected difference in knowledge after observing each possible results of that probe. The probe or probes that maximizes this metric are actively selected for execution. The expected gain in information may be computed as a function of a probability of each possible result of a probe (given by the causal generative model) and a change in probabilities if the result is observed, such that the larger the change in probabilities observing a result, the larger the information gain. The collection of new data from the probe, referred to as probe result, is then use to update knowledge about the state of the components of the system.

Once a subset of probes, which may be a single probe or multiple probes, is selected/generated, the probes are executed on the targeted components of the hybrid application. The execution of the probe(s) on the targeted components indicates whether an anomaly is present in any targeted components, e.g., if a probe tests components 1, 3, and 6, the result of the probe execution will indicate whether an anomaly is present in one of the services 1, 3, or 6, i.e., if the probe generates probe results indicating successful testing of the components 1, 3, and 6, then these components are not a root cause of the anomaly, but if any one of the tested components returns results indicating anomalous operations, then the root cause is determined to be in one of these components. The probe result is then used to update the belief about the state of the system. Starting with an initial state of belief about the state of the system components, an adaptive probing process may be utilized that sequentially selects probes and updates such belief from the probes' results until the beliefs identifies a particular node, or subset of nodes, that are the likely root cause of a detected anomaly, or until all available probes have been executed. In this sequential selection of probes, at each step of the sequential process, the observed probe results are returned to the RCI engine 140 to update the probabilistic predictions about which nodes (e.g., hybrid application components or computing system architecture components) are a root cause. The updated probabilities are again used to determine the set of candidate root causes which then drives the selection of the next probe in this sequential selection process.

Figure 5:
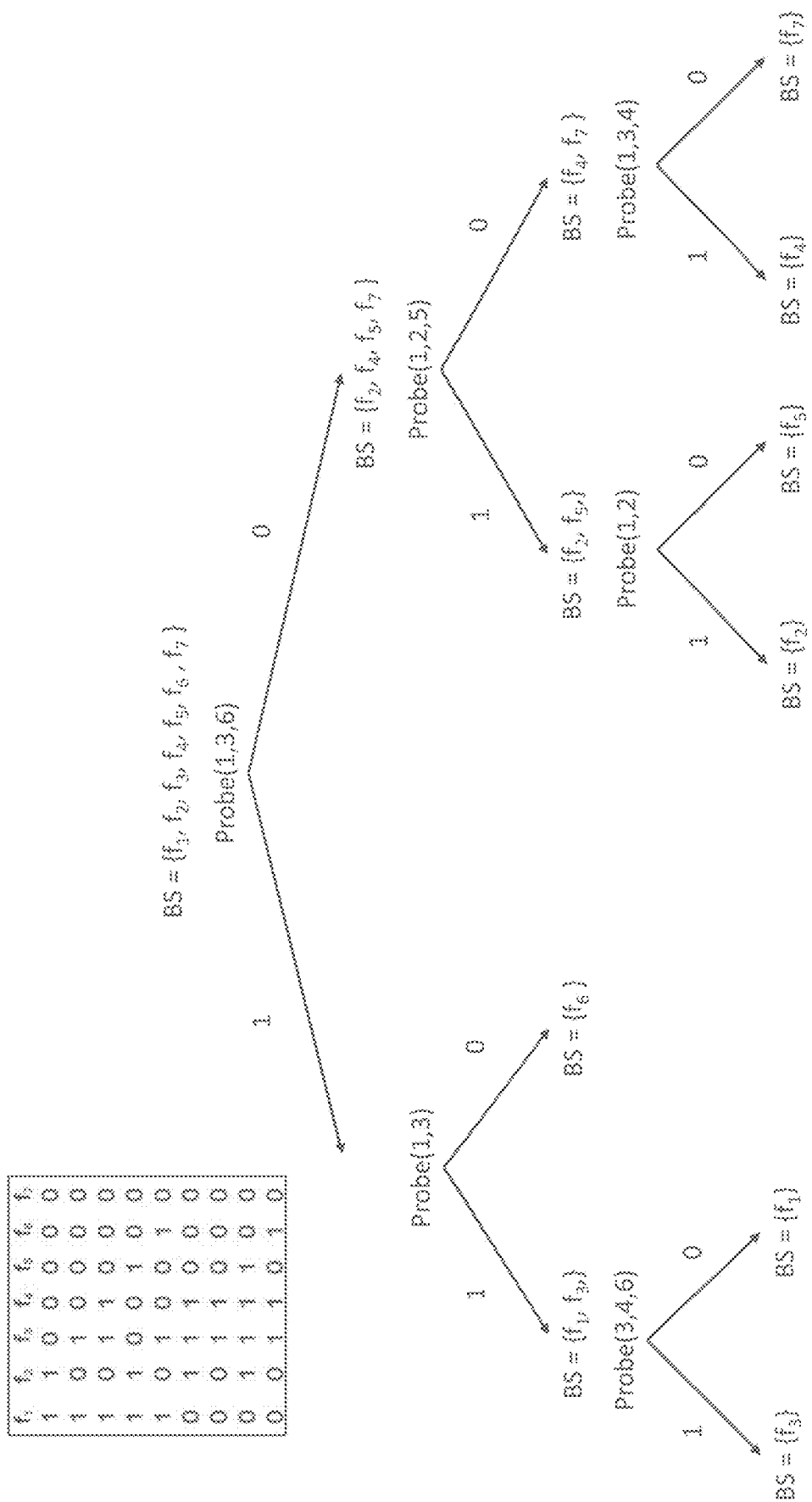
FIG. 5 is an example diagram showing a process for probe selection in accordance with one illustrative embodiment.

FIG. 5 is an example diagram showing a process for probe selection in accordance with one illustrative embodiment. In the example of FIG. 5, a computing system architecture with 6 computing system architecture components, or nodes, is assumed. Suppose the system can be in any of the following 7 states, as shown in the table of FIG. 5: f1 (representing component-node 1 has failed or is functioning anomalously), f2 (representing component 2 has failed or is functioning anomalously), and so on; f7 represents a system state in which all components are functioning correctly. In this example, it is assumed that there could not be two components that have failed at the same time.

Given the topology of the example system, only 9 probes are possible, i.e., there are 9 applicable probes in the probe repository. Each probe is run over a subset of system components and detects whether those system components encounter an issue or anomaly, i.e., returns a 1 in FIG. 5. Otherwise, the probe will return a 0, representing that none of the components through which the probe passes have failed. The 9 probes are: P(1,2), representing a probe that passes through component-nodes 1 and 2, with similar probes for P(1,3), P(1,3,4), P(1,2,5), P(1,3,6), P(2,3,4), P(3,4), P(2,3,4,5), and P(3,4,6).

As shown in FIG. 5, the process starts with an initial state of beliefs represented by the belief state (BS)={f1, f2, f3, f4, f5, f6, f7} in which an anomaly can be a single node-component or in none of them (f7). A probe that provides a maximum information gain in expectation is then selected: In this example, this is the probe P(1,3,6). This probe will test the targeted components and use the result of the probe to update the BS in the causal generative model. In the general case, the particular probe(s) test the targeted components with regard to the specific type of anomaly detected by the anomaly detector, e.g., latency issues may cause a probe that tests network connections or the like to be executed. In the depicted example, it is shown what will happen for each of the two possible results of this probe. If the probe P(1,3,6) returns a 1, the BS is updated to {f1,f3,f6} since it is now known that one of the node-components in the probe has failed (or that an anomaly is detected in one of targeted components). On the other hand, if the probe P(1,3,6) returns a 0, it is because all the components in the probe are functioning correctly (no anomaly is detected in the targeted components), and then the BS is updated to {f2,f4,f5,f7} indicating the system has no components failing (f7) or if there is a failing one it is not any of the components tested by the probe. That is, after probing the targeted components and collecting the additional probe data, the probe data is fed back into the RCI engine which updates the candidate root causes and the process determines whether the updated set of candidate root causes is small enough to identify the root cause.

Based on the result of the probe, additional probes may be sequentially selected down the branching paths of the selection algorithm. For example, in the depicted example, if it is determined that probe P(1,3,6) returns a 1, after updating the belief states about the state of the system to {f1,f3,f6}, representing that now it is known that there must be an anomaly in one of these node-components: 1, 3, or 6; the next probe is selected. In this example, this next probe is P(1,3) which passes through nodes 1 and 3. If the probe indicates that the anomaly is not in one of these nodes, i.e., a result of 0, then it can be determined that the anomaly must be due to node 6, i.e., not 1 or 3. If it is determine that the anomaly is in one of these nodes, i.e., a result of 1, then further probing is performed. In this case, the selected probe among the available ones is P(3,4,6), which probes node 3, but does not probe node 1. Again, if the result is that the probe indicates the anomaly to be present, then the belief state BS is updated to reflect node 3 is the root cause, and if the probe indicates the anomaly is not present, then the belief state (BS) is updated to reflect that node 1 is the root cause of the anomaly.

This process may also be followed if the initial probe P(1,3,6) returns a result of 0 instead of a 1, indicating that there is no anomaly present in any of these nodes, with progress down the right hand side of FIG. 5. Through this sequential and adaptive probing methodology, additional active probe data is collected, and the RCI engine 140 performs expected information gain computations to select the next probe among the ones in the set of available probes. With the results of each probe, the belief sate (BS) is updated and the probabilities of root causes of an anomaly are inferred. This process goes on until no probe is left in the set of available probes that will produce a positive information gain. At this point, ideally one or maybe more root causes of a detected anomaly are presented.

Figure 6:
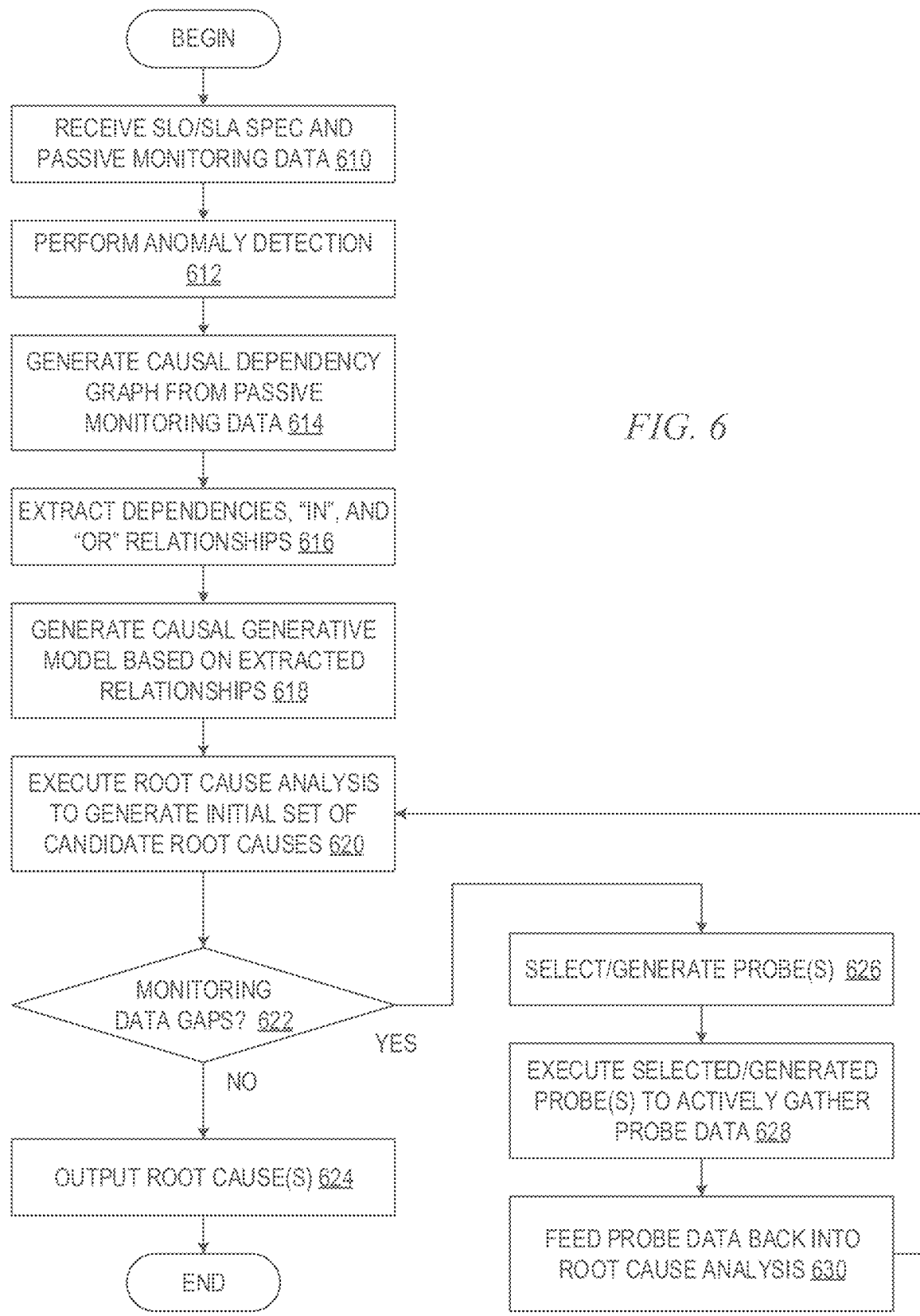
FIG. 6 is a flowchart outlining an example operation of a hybrid application diagnostic system in accordance with one illustrative embodiment.

FIG. 6 presents a flowchart outlining example operations of elements of the present invention with regard to one or more illustrative embodiments. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

FIG. 6 is a flowchart outlining an example operation of a hybrid application diagnostic system in accordance with one illustrative embodiment. As shown in FIG. 6, the operation starts by receiving an SLO/SLA specification and passive monitoring data from a hybrid application execution (step 610). Anomaly detection is performed on the passive monitoring data by evaluating the passive monitoring data against the SLO/SLA specification to determine whether a SLO/SLA performance violation or failure of the hybrid application is detected (step 612). A causal dependency graph data structure is generated from the traces in the passive monitoring data (step 614) and depend, "In", and "Or" relationships between hybrid application components and computer system architecture components are extracted from the causal dependency graph data structure (step 616). The extracted relationships are used as a basis for generating a causal generative model that comprises nodes for modeling the various relationships extracted from the dependency graph data structure (step 618).

A root cause identification is executed based on the causal generative model to generate an initial set of candidate root causes for the detected anomaly (step 620). Based on the initial set of candidate root causes, a determination is made as to whether there are any monitoring data gaps present (step 622). If there are no monitoring data gaps, i.e., no further monitoring or probe data will result in distinguishing between the candidate root causes, or if there is a root cause identified, then the operation outputs the root cause(s) (step 624). If there is a monitoring data gap present, then a set of one or more probes for actively probing the candidate root causes are selected/generated (step 626). The selected/generated probes are executed on the candidate root causes, or a subset of the candidate root causes, to gather probe data (step 628). The probe data is fed back into the root cause identification (step 630) and the operation returns to step 620 where the set of candidate root causes is updated based on an updated and reinforcement learning based modeling of the root causes using the causal generative model. This process repeats until no more monitoring data gaps are identified (step 622) or other stopping criteria occur.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides hybrid application diagnostic functionality for identifying root causes of detected anomalies. The improved computing tool implements mechanism and functionality, such as the hybrid application diagnostic system 100, which cannot be practically performed by human beings either outside of, or with the assistance of, a technical environment, such as a mental process or the like. The improved computing tool provides a practical application of the methodology at least in that the improved computing tool is able to identify hybrid application components and/or corresponding computing system architecture components that are root causes of anomalies in hybrid application performance to thereby facilitate rectifying such anomalies and strengthening the hybrid applications against such anomalous performance.

Figure 7:
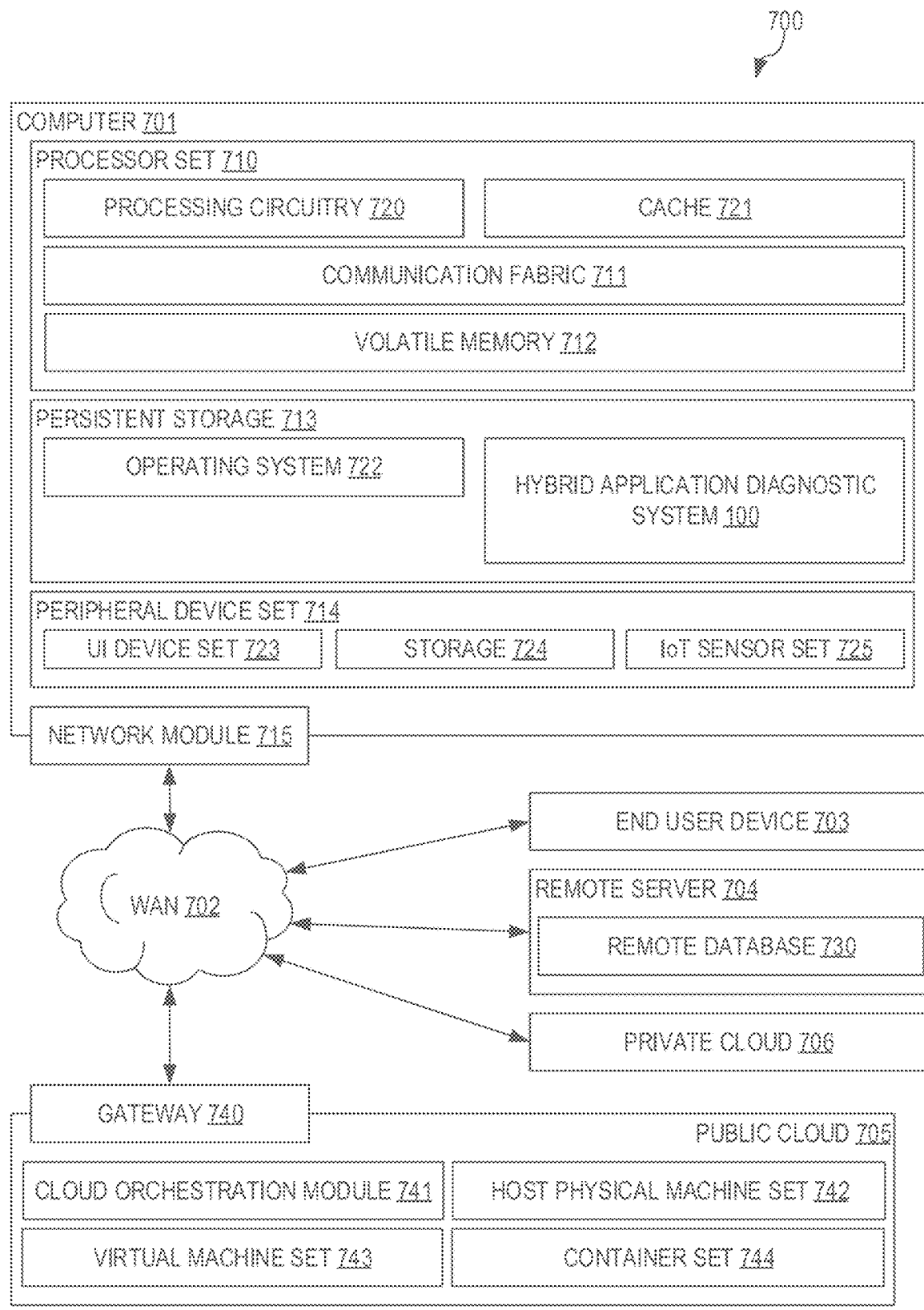
FIG. 7 is an example diagram of a distributed data processing system environment in which aspects of the illustrative embodiments may be implemented and at least some of the computer code involved in performing the inventive methods may be executed.

FIG. 7 is an example diagram of a distributed data processing system environment in which aspects of the illustrative embodiments may be implemented and at least some of the computer code involved in performing the inventive methods may be executed. That is, computing environment 700 contains an example of an environment for the execution of at least some of the computer code involved in performing the inventive methods, such as hybrid application diagnostic system 100. In addition to block 100, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 200, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704, may be specifically configured to implement a hybrid application diagnostic system 100. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates diagnosing the root cause of hybrid application performance anomalies for rectifying actions and strengthening the hybrid application against future similar performance issues.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   automatically detecting, during runtime operation of a hybrid application, an anomaly in performance of the hybrid application based on a specification of required performance and collected passive monitoring data;
   generating a causal generative model based on relationships between hybrid application components and computing system architecture components extracted from the collected passive monitoring data;
   executing a root cause identification (RCI) logic of an RCI engine on the causal generative model to identify a set of candidate root causes of the detected anomaly, wherein the RCI engine comprises automated reinforcement learning computer logic;
   automatically and dynamically identifying one or more probes for active monitoring data collection targeting the set of candidate root causes;
   executing the one or more probes on the set of candidate root causes to collect probe data;
   performing reinforcement learning of the RCI engine at least by updating the RCI logic based on the probe data;
   updating the set of candidate root causes based on the reinforcement learning of the RCI engine, wherein the one or more probes are executed to test at least one corresponding hybrid application component or computing system architecture component and collect operational data from the at least one corresponding hybrid application component or computing system architecture component; and
   using an identified root cause as a basis for resolving the detected anomaly and to strengthen the hybrid application against one or more future anomalies of a same type as the detected anomaly.

2. The method of claim 1, wherein the hybrid application is an application having components that are provided in different cloud computing systems or are provided by different cloud system providers.

3. The method of claim 1, wherein the hybrid application comprises local components and one or more remote components that are services or microservices of one or more cloud computing systems.

4. The method of claim 1, wherein identifying the one or more probes comprises implementing a partially observable Markov decision process that sequentially selects and executes probes while minimizing a total number of probes selected and executed to obtain probe data for identifying a final set of one or more root causes of the detected anomaly.

5. The method of claim 1, wherein identifying one or more probes comprises identifying, in the collected passive monitoring data, at least one passive monitoring data gap, and identifying the one or more probes as one or more probes that target the identified at least one passive monitoring data gap.

6. The method of claim 5, wherein identifying the at least one passive monitoring data gap comprises executing a satisfiability (SAT) solver on the passive monitoring data to identify monitoring data coverage and determining whether a differentiation can or cannot be made between at least two candidate root causes in the set of candidate root causes.

7. The method of claim 1, wherein the collected passive monitoring data comprises path, latency, and error rate or error count data for components of the hybrid application.

8. The method of claim 1, wherein the detected anomaly is a condition represented in the collected passive monitoring data that violates at least one performance requirement specified in a performance service level objective or service level agreement.

9. The method of claim 1, wherein generating the causal generative model comprises:
    generating a causal dependency graph data structure that comprises first nodes representing the hybrid application components, second nodes representing the computing system architecture components, and edges that correlate the hybrid application components with corresponding ones of the computing system architecture components; and
    processing the causal dependency graph data structure to generate the causal generative model which specifies dependencies between the hybrid application components and the computing system architecture components, and further specifies relationships between the hybrid application components and the computing system architecture components.

10. The method of claim 9, wherein the relationships between the hybrid application components and the computing system architecture components comprise "In" relationships that associate the hybrid application components with specific system infrastructure components, and "Or" relationships that specify replica hybrid application components.

11. The method of claim 9, wherein the causal generative model comprises first elements that represent a prior state using a beta distribution and second elements that model expected success using a binomial distribution, and wherein the causal generative model is solved using an inference solver to identify a set of nodes, from at least one of the first nodes or second nodes.

12. The method of claim 11, wherein solving the causal generative model comprises:
    determining, for each of the first nodes and second nodes, a probability value that a corresponding node is a root cause of the detected anomaly;
    comparing each probability value to at least one threshold value to determine if a criterion associated with the at least one threshold value is met by the probability value; and
    selecting nodes, from the first nodes and second nodes, that have probability values that meet the criterion associated with the at least one threshold value as candidate root causes in the set of candidate root causes.

13. The method of claim 1, wherein identifying one or more probes comprises selecting the one or more probes from a probe repository based on a correlation of characteristics of a monitoring data gap in the collected passive monitoring data and characteristics of the probes in the probe repository.

14. The method of claim 1, wherein the one or more probes comprise at least one of synthetic application probes, network level probes, processor probes, and input/output probes.

15. The method of claim 1, wherein executing the RCI logic, identifying one or more probes, executing the one or more probes, performing reinforcement learning, and updating the set of candidate root causes is performed iteratively until a convergence criterion is achieved.

16. The method of claim 15, wherein the convergence criterion is at least one of a determination that no change will be achieved in the set of candidate root causes or a predetermined number of iterations have occurred.

17. The method of claim 1, wherein the causal generative model comprises:
    first nodes corresponding to the hybrid application components,
    second nodes corresponding to the computing system architecture components,
    third nodes corresponding to a prior belief state of the first nodes and second nodes,
    fourth nodes representing relationships between connected ones of the first nodes and second nodes,
    fifth nodes representing weight values applied to outputs of the connected ones of the first nodes and second nodes, and
    sixth nodes representing an observed output of connected first nodes and second nodes.

18. A computer program product comprising a computer readable storage medium having a computer readable program stored therein, wherein the computer readable program, when executed on a data processing system, causes the data processing system to:
    automatically detect, during runtime operation of a hybrid application, an anomaly in performance of the hybrid application based on a specification of required performance and collected passive monitoring data;
    generate a causal generative model based on relationships between hybrid application components and computing system architecture components extracted from the collected passive monitoring data;
    execute a root cause identification (RCI) logic of an RCI engine on the causal generative model to identify a set of candidate root causes of the detected anomaly, wherein the RCI engine comprises automated reinforcement learning computer logic;
    automatically and dynamically identify identifying one or more probes for active monitoring data collection targeting the set of candidate root causes;
    execute the one or more probes on the set of candidate root causes to collect probe data;
    perform reinforcement learning of the RCI engine at least by updating the RCI logic based on the probe data;
    update the set of candidate root causes based on the reinforcement learning of the RCI engine, wherein the one or more probes are executed to test at least one corresponding hybrid application component or computing system architecture component and collect operational data from the at least one corresponding hybrid application component or computing system architecture component; and
    use an identified root cause as a basis for resolving the detected anomaly and to strengthen the hybrid application against one or more future anomalies of a same type as the detected anomaly.

19. An apparatus comprising:
    at least one processor; and
    at least one memory coupled to the at least one processor, wherein the at least one memory comprises instructions which, when executed by the at least one processor, cause the at least one processor to:

automatically detect, during runtime operation of a hybrid application, an anomaly in performance of the hybrid application based on a specification of required performance and collected passive monitoring data;

generate a causal generative model based on relationships between hybrid application components and computing system architecture components extracted from the collected passive monitoring data;

execute a root cause identification (RCI) logic of an RCI engine on the causal generative model to identify a set of candidate root causes of the detected anomaly, wherein the RCI engine comprises automated reinforcement learning computer logic;

automatically and dynamically identifying one or more probes for active monitoring data collection targeting the set of candidate root causes;

execute the one or more probes on the set of candidate root causes to collect probe data;

perform reinforcement learning of the RCI engine at least by updating the RCI logic based on the probe data;

update the set of candidate root causes based on the reinforcement learning of the RCI engine, wherein the one or more probes are executed to test at least one corresponding hybrid application component or computing system architecture component and collect operational data from the at least one corresponding hybrid application component or computing system architecture component; and use an identified root cause as a basis for resolving the detected anomaly and to strengthen the hybrid application against one or more future anomalies of a same type as the detected anomaly.

20. The computer program product of claim 18, wherein identifying the one or more probes comprises implementing a partially observable Markov decision process that sequentially selects and executes probes while minimizing a total number of probes selected and executed to obtain probe data for identifying a final set of one or more root causes of the detected anomaly.

* * * * *